United States Patent [19]

Reich, Jr. et al.

[11] Patent Number: 4,932,553
[45] Date of Patent: * Jun. 12, 1990

[54] RADIATION REDUCING MANWAY DOORS

[75] Inventors: John E. Reich, Jr.; Roland M. Witt, Jr.; David L. Crick, all of Chattanooga, Tenn.; Charles M. Ashman, Weatogue, Conn.

[73] Assignee: Combustion Engineering, Inc., Windsor, Conn.

[*] Notice: The portion of the term of this patent subsequent to Jan. 31, 2006 has been disclaimed.

[21] Appl. No.: 176,029

[22] Filed: Mar. 31, 1988

[51] Int. Cl.$^5$ ............................................. B65D 51/00
[52] U.S. Cl. ................................. 220/254; 250/517.1; 376/205; 376/287
[58] Field of Search ......... 49/25, 62, 63, 65, 168–171, 49/400, 402; 165/11.2, 72; 220/254; 250/515.1, 517.1; 376/203–205, 287

[56] References Cited

U.S. PATENT DOCUMENTS

| | | | |
|---|---|---|---|
| 962,174 | 6/1910 | Stevenson | 49/402 |
| 1,238,692 | 8/1917 | Krogel | 49/168 |
| 1,485,312 | 2/1924 | Sweeley | 49/402 |
| 2,141,481 | 12/1938 | Mattingley | 49/62 |
| 2,970,347 | 2/1961 | Massopust | 49/401 |
| 4,071,404 | 1/1978 | Aoki | 376/287 |
| 4,095,640 | 6/1978 | Beckerer, Jr. | 49/402 |
| 4,519,519 | 5/1985 | Meuschke et al. | 138/89 |
| 4,801,423 | 1/1989 | Warren et al. | 376/287 |

FOREIGN PATENT DOCUMENTS

| | | | |
|---|---|---|---|
| 0539521 | 4/1925 | France | 49/400 |
| 2541034 | 8/1984 | France | 376/203 |
| 0164996 | 9/1984 | Japan | 376/287 |

Primary Examiner—Jimmy G. Foster
Attorney, Agent, or Firm—Chilton, Alix & Van Kirk

[57] ABSTRACT

A radiation reducing door assembly comprises a mounting bracket having hinge means affixed thereto, said hinge means defining different axes of rotation for doors of at least two types, the doors being sized and shaped to overlie at least a portion of the opening with which the assembly is associated. The door assembly also includes means for rotatably coupling the removable doors to the hinge means whereby the mounted door is supported from said bracket and may be pivoted between open and closed positions.

15 Claims, 3 Drawing Sheets

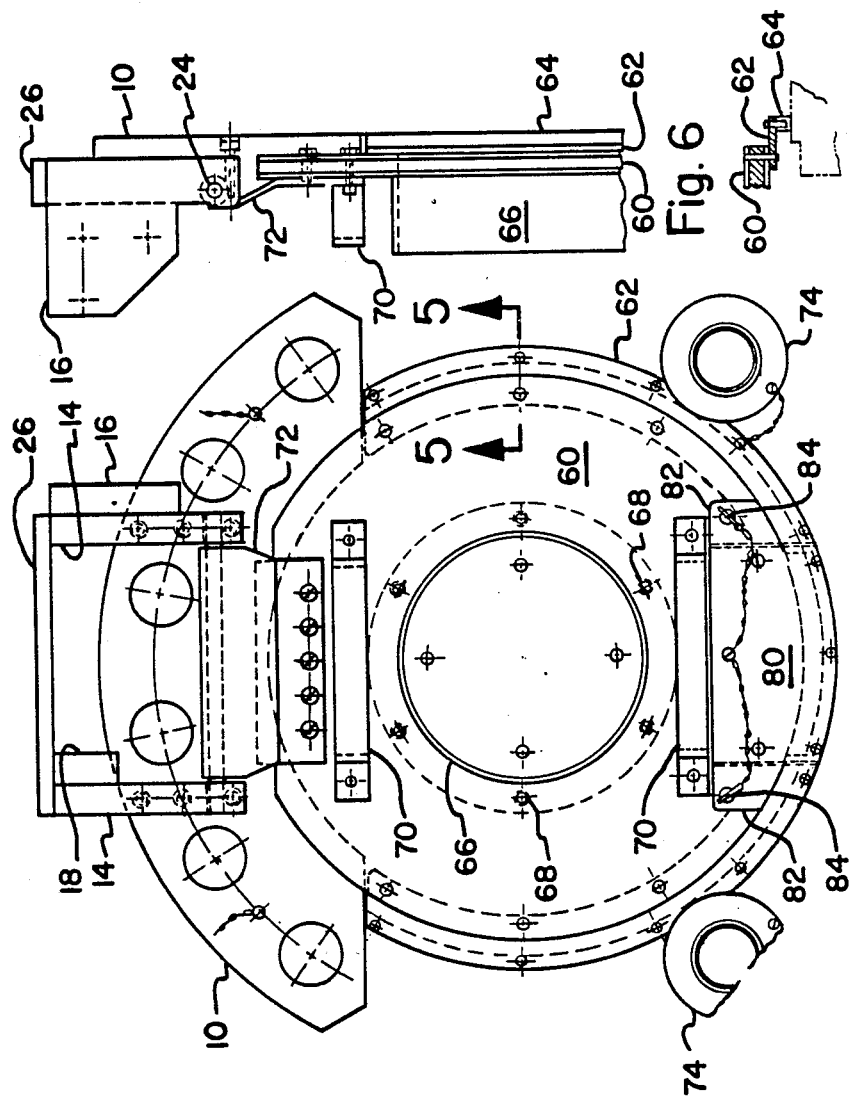

RADIATION REDUCING MANWAY DOORS

BACKGROUND OF THE INVENTION

1. Field of the Invention

The present invention relates to "door" assemblies which may be rapidly and easily installed over access openings, such as manways which are provided in the vessels of steam generators in a nuclear power plant, after removal of the covers from such access openings pursuant to a maintenance and/or inspection procedure. More specifically, this invention is directed to radiation reducing "door" assemblies which enable tools and/or electrical cables to extend through the access opening with which the "door" assembly is temporarily associated and particularly to radiation reducing "door" assemblies which, even with a tool and/or cables entering the steam generator therethrough, minimize the exposure to radioactivity of service personnel performing maintenance on the steam generator of a nuclear power system. Accordingly, the general objects of the present invention are to provide novel and improved apparatus and methods of such character.

2. Description of the Prior Art

For a description of the problem to which the present invention is directed, and an example of a prior solution to that problem, reference may be had to U.S. Pat. No. 4,801,423 which is assigned to the assignee of the present invention. The radiation shielding door assembly of the referenced patent has many attributes which are shared by the present invention. The door assembly of the referenced patent is intended for use with tools which are installed in the steam generator and subsequently remotely controlled via cables which extend over the lip of the steam generator access opening via a gap which is left between the door assembly and the wall of the steam generator. In other words, the radiation shielding door assembly of the referenced patent, as shown in FIGS. 2 and 3 thereof, prevents any line-of-sight "streaming" of radiation out of the steam generator.

It has been found, in many instances, that it is necessary or desirable to employ tool manipulators in the course of performing maintenance and/or inspection procedures on a steam generator. These tool manipulators include elongated, articulated arms which extend into the interior of the steam generator through the access opening and are actuated to position tools at any selected location on the tube sheet of the steam generator. Such tool manipulators may be mounted on the flange which defines the steam generator vessel manway and have the capability of extending their distal ends back out through the manway opening. This permits tools and other material to be delivered into the steam generator and also to be retrieved therefrom, for example for the purpose of tool changing, without dismounting of the tool manipulator from the steam generator. In order to accommodate such tool manipulators, a radiation shielding door assembly which does not completely obscure the line-of-sight between the interior and exterior of the steam generator via the manway opening must be provided. Such a door assembly must not interfere with the mounting of the manipulator and must have the capability to establish a substantially air-tight seal about the manway opening when the tool manipulator is removed.

SUMMARY OF THE INVENTION

The present invention comprises a novel and improved door assembly which may be employed to allow access by service personnel to the environment behind the door, may also be employed as an access opening for a tool when in a closed condition and may further be utilized to couple the environment behind the closed door to a source of ventilating gas. The door assembly of the present invention is further characterized by ease of both installation and change of function and, when employed as a ventilating gas coupler, by the ability to establish a seal about the steam generator access opening.

Apparatus in accordance with the present invention comprises a one piece flange-type mounting bracket which pivotally supports a door. In accordance with a first embodiment, the door is supported via hinge pins. In accordance with one alternative of this first embodiment, the door includes a cover which, when the door is in the closed position, defines an opening which allows a tool manipulator or the like to communicate between the environments at the opposite sides of the door. The cover includes at least a pair of relatively adjustable plate members whereby the size of the door defined opening may be varied, i.e., the door functions generally as a shutter which may be easily manually adjusted to a desired opening while in place.

In accordance with a further embodiment, the door comprises a ventilation port defining cover having a tubular projection to which a conduit leading to or from a source of ventilation gas may be attached. This ventilation door is constructed such that, when in the closed position, it will establish a seal about the periphery of the access opening with which the door is temporarily associated. The ventilation door embodiment is also preferably provided, in a peripheral region thereof, with a cable access port which permits equipment control cables or the like to extend into the environment behind the closed ventilation door while simultaneously preventing line-of-sight communication between the environment behind the door and the environment in front of the door.

The mounting bracket portion of a door assembly in accordance with the present invention is characterized by ease of installation on a pressure vessel or the like. This bracket is further characterized, in a first embodiment, by a first means for pivotally supporting a tool access opening defining door subassembly and second means for pivotally supporting a ventilation door subassembly. The two supporting means define a pair of pivot axes which are offset from one another and from the outwardly facing surface of the bracket. The two different types of door assemblies may be quickly and easily mounted on and disassembled from their respective pivotal support means.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 5 is a front plan view of a ventilation door assembly in accordance with the present invention;

FIG. 6 is a side elevation view of the door assembly of FIG. 5; and

FIG. 7 is a partial cross-sectional view, taken along line 5—5 of FIG. 5, of the edge portion of the door assembly of FIGS. 5 and 6.

DESCRIPTION OF THE DISCLOSED EMBODIMENT

Figures 1, 2:
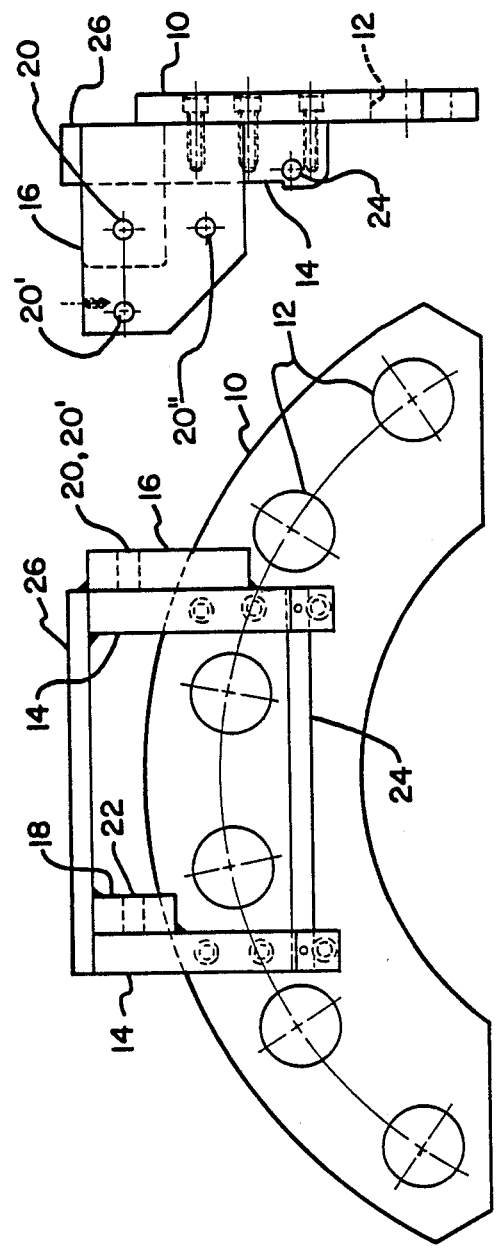
FIG. 1 is a front plan view of a flange-type mounting bracket in accordance with a preferred embodiment of the present invention.
FIG. 2 is a side elevation view of the bracket of FIG. 1.

With reference to FIGS. 1 and 2, the disclosed mounting bracket is intended to be removably affixed to the exterior of the containment structure of a steam generator of a nuclear power system. The steam generator will be provided with manways to provide access to the interior thereof. The manways will be defined by annular flanges of equal size and shape which are welded to the steam generator pressure vessel. These manway defining flanges are provided with a plurality of threaded holes having their axes located on a circle. These threaded holes receive, threaded studs by which the manway cover is bolted to the flange to normally seal the manway.

The mounting bracket of FIGS. 1 and 2 comprises an arcuate flange 10 which is provided with an array of holes 12 on the stud circle diameter of the manway flange. The holes 12 are spaced apart by the same distance as the manway cover studs. Accordingly, the flange 10 may be installed with or without all of the manway cover mounting studs in place.

The mounting bracket of the disclosed embodiment further comprised a pair of arm support plates 14 which are bolted or otherwise affixed to the surface of flange 10 which faces outwardly when the flange is in the installed condition. A first door support arm 16, which may be best seen from FIG. 2, extends outwardly from one of the arm supports 14. The planes defined by the opposite faces of arm 16 are oriented generally transversely with respect to the planes defined by the surfaces of flange 10. Arm 16 is secured to its abutting arm support 14 by welding or any other suitable technique. Arm 16 is provided with a triangular pattern of mounting holes 20, 20' and 20''. A second door support arm 18 is affixed to the other arm support 14 as shown and is provided with at least one mounting hole 22. Hole 22 is in axial alignment with hole 20 in arm 16. The mounting bracket further comprises a hinge pin 24 which extends between the support plates 14 adjacent the lower ends thereof. Finally a rigidizing member 26 extends between, and is rigidly secured to, the ends of the arm support plates which extend upwardly beyond the outer diameter of the flange 10. The rigidizing member 26 is typically welded to the arms 16 and 18 and to at least the right hand one of the arm support plates 14. The above-described mounting bracket will typically be installed such that the axis of the pin 24 is oriented generally horizontally. Mounting will be accomplished by means of a pair of mounting bolts, not shown, which are tethered to the flange 10 by means of flexible retaining wires. These mounting bolts, of course, are selected so that they will engage the threaded stud holes in the manway flange. The retaining wires will be sufficiently long, and their anchoring points selected, such that the availability of any one of three manway flange apertures will permit installation of each mounting bolt.

Figure 4:
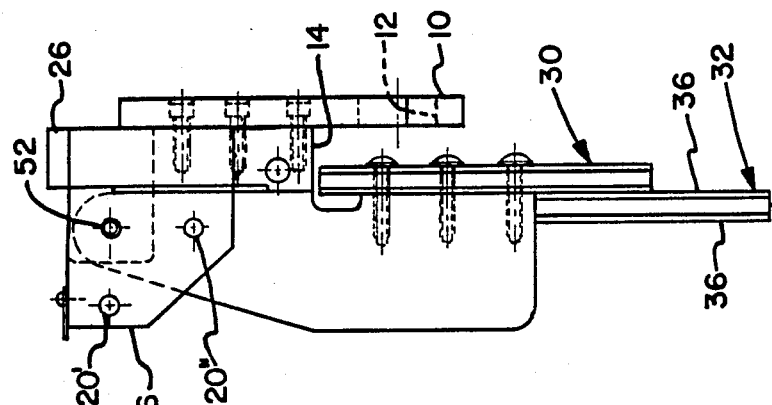
FIG. 4 is a side elevation view of the door assembly of FIG. 3.
Figure 3:
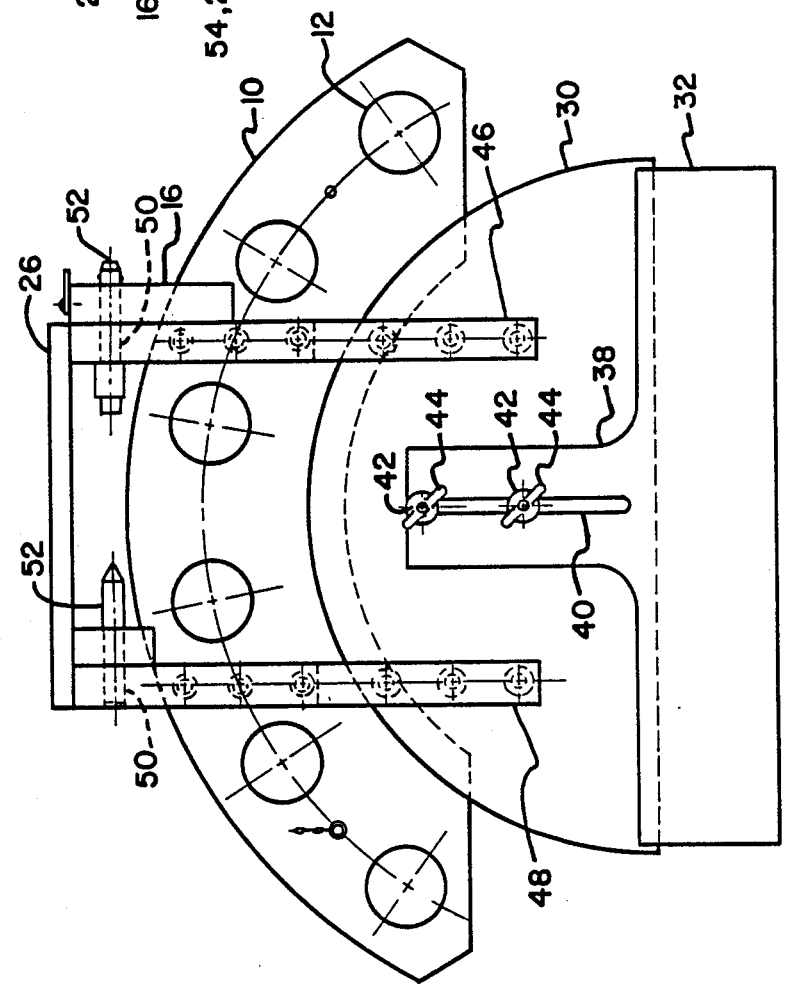
FIG. 3 is a front plan view of a tool manipulator access opening defining door assembly in accordance with a preferred embodiment of the present invention.

Referring to FIGS. 3 and 4, a first embodiment of a door subassembly in accordance with the present invention is shown pivotally coupled to the mounting bracket of FIGS. 1 and 2. The door subassembly includes first and second cover members, indicated respectively at 30 and 32, which are each comprised of a lead sheet 34, provided for radiation shielding purposes, sandwiched between plates 36 which impart structural rigidity to the door. The plates 36, in one reduction to practice, were comprised of anodized aluminum. In the disclosed embodiment, the cover member 30 is of semi-circular shape and the cover member 32 is of generally rectangular shape and is radially adjustable with respect to member 30 in the vertical direction when the mounting bracket/door subassembly is installed for use. It will be understood that the shape of cover member 32, particularly the lower edge thereof, may be selected to satisfy the application. For example, the cover member 32 may be complimentary in shape to the tool manipulator with which it cooperates.

As depicted in FIGS. 3 and 4, the door assembly is in its full closed position and thus the size of the tool manipulator access opening defined by the lower edge of cover member 32 and the manway flange is minimized. The adjustment of cover member 32 relative to cover member 30, in the disclosed embodiment, is easily accomplished by providing an extension 38, having a guide slot 40 therein, on member 32. A plurality of threaded fasteners 42, two in the embodiment disclosed, extend outwardly from cover member 30 to engage the slot 40. Wing nuts 44 are provided to engage the fasteners 42 to lock the member 32 in the desired position and to allow the tool access opening to easily be enlarged as necessary during tool changing. In an alternative embodiment, the extension 38 of cover member 32 was omitted, the member 32 was extended in height and a plurality of guide slots spaced along the width of the plate were provided. Each of these plural guide slots was engaged by at least one threaded fastener extending from the cover member 30. In either case, the cover members 30 and 32 cooperate to define a shutter-type cover for the manway access opening, that shutter having a minimum opening in case of the disclosed embodiment. As discussed above, by modification of the size and shape of the adjustable cover member 32, the shape and location of the variable size opening defined by the door can be changed. The size of the opening will, of course, be selected to be the minimum necessary to permit operation of a tool manipulator or other piece of equipment which extends into the interior of the steam generator vessel.

The shutter, i.e., the interconnected cover members 30 and 32, is coupled to the mounting bracket by means of a hinge assembly comprising a pair of parallel arms 46, 48. The arms 46, 48 are bolted to the upper, i.e. the semi-circular, cover member 30 as may best be seen from FIG. 4. At the ends disposed away from cover member 30, the arms 46, 48 are provided with aligned through-holes 50 which may be placed in registration with the holes 20, 22 respectively in arms 16 and 18. When the door has been positioned with the holes 50 in alignment with the holes 20 and 22, detent pins 52 are inserted and the door will subsequently hang from and pivot about these detent pins. A second through hole 54 is provided in arm 46 so as to align with hole 20' in arm 16 with the door in the closed position and to align with hole 20" with the door in the open position. Accordingly, through the use of a third detent pin, the door assembly may be captured in the fully open or fully closed position. As will be obvious from FIG. 4, when the door is in the closed position there will be a gap between the cover members 30, 32 and the steam generator manway defining flange. Accordingly, even if the opening defined by the door subassembly is fully occupied by a tool which extends therethrough, there will be a space for circulation of a ventilation gas and the passage of control cables.

Referring now to FIGS. 5-7, a ventilation door assembly, including a ventilation door supported from the mounting bracket of FIGS. 1 and 2 in place of the tool manipulator door shown in FIGS. 3 and 4, is depicted. The ventilation door comprises a cover member 60 of generally annular shape and of the same sandwich construction as described above with respect to the door of FIGS. 3 and 4. The ventilation or exhaust door is also provided, extending outwardly from the periphery of the cover member 60, with a discontinuous plate 62 which defines a rim-like extension of member 60. Plate 62 is also comprised of anodized aluminum. Aluminum spacers 64 are bolted to plate 62 as shown in FIG. 7. With the ventilation door in the closed position, the spacers 64 seal against the manway flange inside of the circular array of threaded holes therein. A tubular extension 66, which may be provided with a cover plate of sandwich construction, is attached to cover 60 so as to be coaxial with the hole therethrough as shown. This attachment may be by means of bolts or by welding. A plurality of spaced studs 68 extend through the annular cover member 60 and support, from the inside of the ventilation door, a baffle member in the manner shown in FIG. 5 of U.S. Pat. No. 4,801,423. A pair of handles 70 are provided on the outwardly facing side of the ventilation door as shown.

The means by which the ventilation door is coupled to the mounting bracket comprises a hinge plate 72 which is bolted to the outside of annular cover 60 as shown. Referring to FIG. 6, the hinge plate has a lower portion which is flush with the surface of the cover member 60, an outwardly angled intermediate portion and an upper hook portion which is sized and shaped to engage the hinge pin 24. Thus, the hinge plate is provided with an offset such that the axis of rotation of the ventilation door is spaced outwardly with respect to the face of the cover member 60 to which the hinge plate is affixed. Because of this offset, when the door is in the closed position, the plane defined by the free end of the spacers 64 will be parallel with the plane defined by the manway opening flange and the free end of the spacers 64 will be in contact with the manway flange thus establishing a seal. This seal may be enhanced through the use of a pair of clamp-down members 74 which comprise threaded studs which engage threaded openings in the manway flange and which have outwardly extending rims which engage over the plate 62 as shown.

As in the case of the ventilation door of U.S. Pat. No. 4,801,423, the annular cover member 60 of the ventilation door is provided, at its lower edge, with a cut-out which is normally covered by a shielding cover 80. This cut-out defines a cable access port which enables wires and conduits to exit the steam generator vessel when the ventilation door is in place. In one embodiment, with the shielding cover 80 secured in place on the outer face of member 60, an opening is provided which permits cables and/or conduits to be fed vertically upwardly over the plate 62 and through the opening in the member 60. The cover 80 may be comprised of the same sandwich material as the annular member 60 and the outer plate of the laminate will, in such case extend outwardly to the diameter of plate 62. Spacers may be provided to space and support the lower edge of the cover 80 from the manway flange.

In an alternative construction, the cover 80 may be generally of identical construction to the above-described combination of cover member 60, extension plate 62 and spacer 64. In this case, which is the embodiment depicted in the drawing, the cover plate is provided with a pair of outwardly extending ears 82 and is held in position by means of a pair of detent type pins 84 which extend through these ears and through the annular cover member 60. The detent pins are, as shown, tethered to the cover 80. Thus, in the arrangement depicted, when it is desired to pass cables and/or conduits through the ventilation door into the steam generator vessel, the cover 80 is simply removed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A readily mountable/demountable protective cover assembly for an opening in the wall of a vessel, the opening having an axis and a generally rounded shape, a flange extending continuously about the periphery of the opening at the exterior of the vessel, the flange having a face which defines a plane and also having a plurality of spaced apertures therein, said cover assembly comprising:
    a unitary mounting bracket, said bracket being sized and shaped to at least partly overlie the flange and be commensurate in shape with an arcuate portion of said opening periphery, said bracket being provided with a plurality of mounting holes arranged in a pattern which matches at least a portion of the pattern of apertures in the flange;
    hinge means affixed to said bracket, said hinge means defining at least a first axis of rotation spaced outwardly with respect to the flange defined plane;
    door means sized and shaped to overlie at least a portion of the vessel opening; and
    means for rotatably and removable coupling said door means to said hinge means whereby said door means is supported from said bracket and may be pivoted between open and closed positions.

2. The apparatus of claim 1 wherein said hinge means defines a second axis of rotation which is parallel to and offset from said first axis of rotation.

3. The apparatus of claim 2 wherein said hinge means comprises:
    a pair of supports which extend outwardly from said mounting bracket, said supports being oriented substantially parallel to one another.

4. The apparatus of claim 3 wherein said door means comprises:
    least two relatively adjustable cover members, said cover members defining a tool access port of variable size whereby a tool may be extended through the opening defined by the flange when said protective cover assembly is in the installed and closed position.

5. The apparatus of claim 4 wherein a first cover member of said door means comprises:
a first plate member; and
a pair of generally parallel arms extending outwardly from said first plate member, each of said arms including a hinge pin receiving channel; and wherein said hinge means comprises:
a pair of outwardly extending supports, said outwardly extending supports being substantially parallel to one another, each of said supports being provided with a hinge pin receiving channel, said supports being spaced apart by a distance which permits said supports to be placed in abutting relationship with said arms; and wherein said coupling means comprises:
hinge pins which may be passed through aligned channels in said arms and supports.

6. The apparatus of claim 3 wherein a first cover member of said door means comprises:
a first plate member; and
a pair of generally parallel arms extending outwardly from said first plate member, each of said arms including a hinge pin receiving channel; and wherein said coupling means comprises:
hinge pins which may be passed through aligned channels in said arms and supports.

7. The apparatus of claim 6 wherein said coupling means comprises:
a pin extending between said supports, said pin being sized and shaped to be engaged by said hanger means.

8. The apparatus of claim 7 wherein said hanger means has a non-linear configuration and supports said door means parallel to the plane defined by the flange.

9. The apparatus or claim 8 wherein said door means further comprises:
generally L-shaped rim means attached to the outer periphery of said annular member, said rim means defining an annular sealing surface at the free end thereof, said sealing surface defining a plane which contacts the flange with said door means in the closed position.

10. A readily mountable/demountable protective cover assembly for an opening, the opening having an axis and being defined by a flange, the flange having a face which defines a plane and also having a plurality of spaced apertures therein, said cover assembly comprising:
a unitary mounting bracket, said bracket being sized and shaped to at least partly overlie the flange, said bracket being provided with a plurality of mounting holes arranged in a pattern which matches at least a portion of the pattern of apertures in the flange;
hinge means affixed to said bracket, said hinge means defining at least a first axis of rotation spaced outwardly with respect to the flange defined plane;
door means sized and shaped to overlie at least a portion of the flange defined opening, said door means including at least two relatively adjustable cover members, said cover members defining an access port of variable size whereby an object may pass through the opening defined by the flange when said protective cover assembly is in the installed and closed position; and
means for rotatably and removably coupling said door means to said hinge means whereby said door means is supported from said bracket and may be pivoted between the closed position and an open position.

11. The apparatus of claim 10 wherein a first cover member of said door means comprises:
a first plate member; and
a pair of generally parallel arms extending outwardly from said first plate member, each of said arms including a hinge pin receiving channel; and wherein said hinge means comprises:
a pair of outwardly extending supports, said outwardly extending supports being substantially parallel to one another, each of said supports being provided with a hinge pin receiving channel, said supports being spaced apart by a distance which permits said supports to be placed in abutting relationship with said arms; and wherein said coupling means comprises:
hinge pins which may be passed through aligned channels in said arms and supports.

12. A readily mountable/demountable protective cover assembly for an opening, the opening having an axis and being defined by a flange, the flange having a face which defines a plane and also having a plurality of spaced apertures therein, said cover assembly comprising:
a unitary mounting bracket, said bracket being sized and shaped to at least partly overlie the flange, said bracket being provided with a plurality of mounting holes arranged in a pattern which matches at least a portion of the pattern of apertures in the flange;
hinge means affixed to said bracket, said hinge means defining at least a first axis of rotation spaced outwardly with respect to the flange defined plane;
door means sized and shaped to overlie at least a portion of the flange defined opening, said door means defining a ventilation port and including:
a generally annular shaped member, said annular shaped member defining a plane; and
hanger means attached to said annular shaped member; and
means for rotatably and removably coupling said hanger means to said hinge means whereby said door means is supported from said bracket, said coupling means being sized and shaped to be engaged by said hanger means.

13. The apparatus of claim 12 wherein said hinge means comprises:
a pair of supports which extend outwardly from said mounting bracket, said supports being oriented substantially parallel to one another; and wherein said coupling means comprises:
a pin extending between said supports, said pin being sized and shaped to be engaged by said hanger means.

14. The apparatus of claim 13 wherein said hanger means has a non-linear configuration and supports said door means parallel to the plane defined by the flange.

15. The apparatus of claim 12 wherein said door means further comprises:
generally L-shaped rim means attached to the outer periphery of said annular member, said rim means defining an annular sealing surface at the free end thereof, said sealing surface defining a plane which contacts the flange with said door means in the closed position.

* * * * *